No. 660,991. Patented Oct. 30, 1900.
E. JÜRGENS.
COOKING APPLIANCE.
(Application filed Dec. 5, 1899. Renewed Aug. 27, 1900.)
(No Model.)
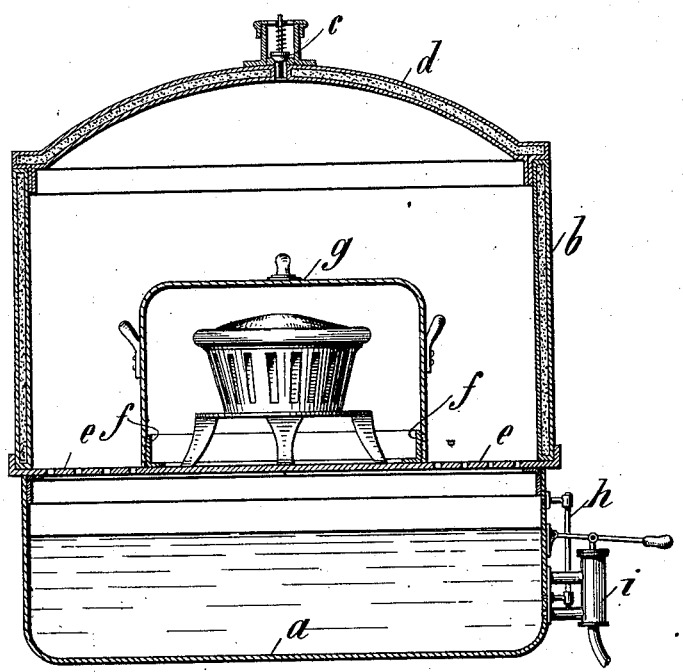

UNITED STATES PATENT OFFICE.

EMMA JÜRGENS, OF FRIEDENAU, GERMANY.

COOKING APPLIANCE.

SPECIFICATION forming part of Letters Patent No. 660,991, dated October 30, 1900.

Application filed December 5, 1899. Renewed August 27, 1900. Serial No. 28,245. (No model.)

*To all whom it may concern:*

Be it known that I, EMMA JÜRGENS, a subject of the King of Prussia, German Emperor, residing at No. 66 Friedenauerstrasse, Friedenau, near Berlin, Germany, have invented new and useful Improvements in Cooking Appliances, of which the following is a specification.

The present invention relates to an improved cooking appliance especially adapted for baking cake or bread, the purpose of the invention being to so construct this class of steam-heated devices that the chamber containing the food to be cooked is kept perfectly dry, that it is uniformly heated from all sides, that the steam produced by means of the device is confined, and that the water-receptacle can be refilled during cooking without disturbing the action of the appliance.

With these ends in view the invention consists in certain novel features of construction, combination, and adaptation of parts, all as more fully hereinafter described, and shown in the accompanying drawing, and the essential elements of which are recited in the appended claims.

In the accompanying drawing, which forms part of this specification, my improved cooking appliance is shown in a vertical section.

The appliance essentially comprises the water-receptacle $a$ and the steam-chamber $b$, connected one with the other in any suitable and steam-tight manner. The steam-chamber $b$ is fitted with a double shell and suitably closed on top by means of a lid $d$, fitted with a safety-valve $c$. The lid $d$, which is likewise composed of a double shell, is suitably screwed or bolted onto the steam-chamber $b$. The space between the two shells of the steam-chamber $b$ and of the lid $d$ is filled with heat-non-conducting material of any suitable kind. The bottom $e$ of the steam-chamber $b$ is fitted concentrically with an annular ridge $f$, externally screw-threaded for the purpose of screwing thereto steam-tight a bell or dome $g$ of suitable material. Outside the annular ridge $f$ the bottom $e$ is perforated. The water-receptacle $a$ is fitted with a water-gage $h$ and a suction-pump $i$. The latter can be in connection with any suitable source of water-supply.

The operation of my improved cooking appliance is as follows: After the water-receptacle $a$ has been filled to a suitable height with water the food to be cooked is placed on the bottom $e$ of the steam-chamber $b$ inside the annular ridge $f$, and thereupon the bell or dome $g$ is screwed tightly onto said ridge $f$. The steam developed in the boiler $a$ rises through the perforated bottom $e$ of the steam-chamber $b$, enveloping the bell $g$ on all sides, so that the cake, bread, or other foodstuff contained in said bell $g$ is uniformly cooked. The condensed steam is not lead off, but precipitates through the perforations in the bottom $e$ back into the water-receptacle $a$. By means of the suction-pump $i$ the water volume in the receptacle $a$ can be kept constant during cooking, should it be necessary, without disturbing the process of cooking.

It is obvious that I do not limit myself to any special dimensions of the annular ridge $f$ and of the bell $g$.

What I claim as new, and desire to secure by Letters Patent, is—

1. A cooking appliance essentially composed of a water-receptacle and a steam-chamber secured thereto, the bottom of the steam-chamber fitted concentrically with an annular externally-screw-threaded ridge and perforated outside said ridge, a bell adapted to be screwed onto the ridge, said bell adapted to cover the foodstuff to be cooked, and a water-gage and a suction-pump in connection with the water-receptacle, substantially as described and shown and for the purposes specified.

2. A cooking appliance comprising in combination a water-receptacle fitted with a water-gage and a suction-pump for keeping the water volume constant, a steam-chamber covered by a lid fitted with a safety-valve tightly secured to the upper edge of the water-receptacle, heat-non-conducting material employed in connection with the shell and lid of the steam-chamber, an annular externally-screw-threaded ridge fitted concentrically to the bottom of the steam-chamber, said bottom perforated outside the annular ridge, and a bell adapted to be screwed onto the annular ridge, said bell adapted to cover the foodstuff to be cooked, substantially as described and shown and for the purposes specified.

In testimony whereof I have hereunto set my hand in presence of two subscribing witnesses.

EMMA JÜRGENS.

Witnesses:
   WOLDEMAR HAUPT,
   HENRY HASPER.